United States Patent [19]

Ota et al.

[11] Patent Number: 4,717,194
[45] Date of Patent: Jan. 5, 1988

[54] SEAT SLIDE DEVICE

[75] Inventors: Toshihiko Ota; Chiyokatsu Yokokura, both of Kanagawa, Japan

[73] Assignee: Ikeda Bussan Co., Ltd., Ayase, Japan

[21] Appl. No.: 934,712

[22] Filed: Nov. 25, 1986

[30] Foreign Application Priority Data

Jan. 29, 1986 [JP] Japan .................................. 61-17295

[51] Int. Cl.⁴ .............................................. B60N 1/08
[52] U.S. Cl. ................................ 296/65 R; 297/340; 248/430
[58] Field of Search .......................... 296/65 R, 65 A; 297/340; 248/430

[56] References Cited

U.S. PATENT DOCUMENTS

| 4,015,877 | 4/1977 | Button | 296/65 R |
| 4,515,404 | 5/1985 | Nishimura | 296/65 R |
| 4,556,186 | 12/1985 | Langmesser et al. | 296/65 R |
| 4,572,469 | 2/1986 | Rees | 296/65 R |
| 4,624,498 | 11/1986 | Nagashima | 296/65 R |

FOREIGN PATENT DOCUMENTS 58-3692 1/1983 Japan .

Primary Examiner—Robert R. Song
Attorney, Agent, or Firm—Schwartz, Jeffery, Schwaab, Mack, Blumenthal & Evans

[57] ABSTRACT

A plurality of slide assisting units are operatively disposed between stationary and movable rails in order to smooth movement of the movable rail relative to the stationary rail. A projected structure is connected with a terminal one of the slide assisting units. The projected structure extends in a certain direction beyond the terminal unit in order that when the movable rail is subjected to a force which acts in a direction essentially normal to the certain direction, the projected structure interconnects the movable and stationary rails in a manner to reduce the length of the movable rail over which the force can act to produce a moment of force which tends to bend the movable rail away from the stationary rail.

9 Claims, 12 Drawing Figures

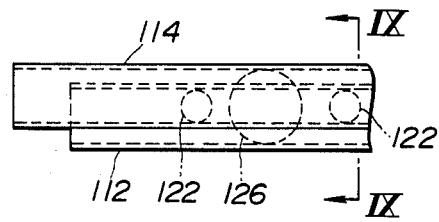
FIG.8 (PRIOR ART)
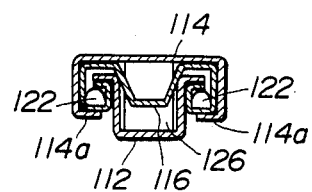
FIG.9 (PRIOR ART)
FIG.10 (PRIOR ART)
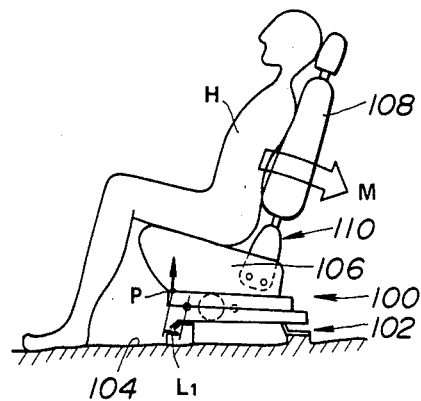
FIG.11 (PRIOR ART)
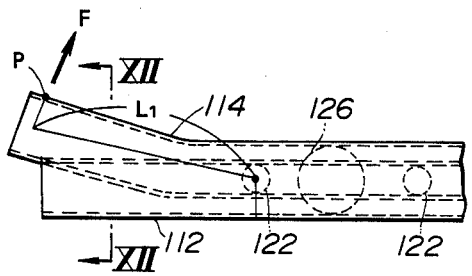
FIG.12 (PRIOR ART)
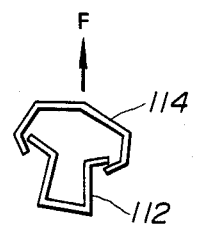

SEAT SLIDE DEVICE

BACKGROUND OF THE INVENTION

1. Field of the Invention

The present invention relates in general to a seat assembly of a motor vehicle, and more particularly to a seat slide device which is capable of sliding the seat in fore-and-aft direction to a desired locked position for providing at seat occupant with a comfortable sitting posture.

2. Description of the Prior Art

In order to clarify the task of the present invention, one conventional seat slide device will be described with reference to FIGS. 7 to 12 of the accompanying drawings.

Referring to FIGS. 7 to 12, particularly FIG. 10, there is shown a seat assembly 100 which is equipped with a conventional seat slide device 102 for movement in fore-and-aft direction to a desired locked position relative to a vehicle floor 104. The seat assembly 100 comprises a seat cushion 106 mounted on the seat slide device 102, and a seat back 108 pivotally connected to the seat cushion 106 through a known reclining device 110.

The seat slide device 102 comprises two slide units which are parallelly arranged between the seat cushion 106 and the vehicle floor 104. The two slide units are essentially the same in construction and configuration. As is seen from FIGS. 8 and 9, each slide unit comprises a stationary rail 112 which is secured to the vehicle floor 104 to extend in fore-and-aft direction, and a movable rail 114 which is secured to the seat cushion 106 and slidably disposed on the stationary rail 112.

A plurality of slide assisting units 116, as shown in FIG. 7, are arranged between the stationary and movable rails 112 and 114 in order to provide smooth sliding movement of the movable rail 112 relative to the stationary rail 114.

Each slide assisting unit 116 comprises a generally rectangular base structure 118 which is formed with a pair of curled side portions each having at the lower portion thereof two circular cuts 120 for rotatably receiving therein bearing balls 122. The base structure is further formed at its middle portion with a rectangular opening 124 for rotatably receiving therein a roller 126.

As is seen from FIG. 9, upon assembly, the roller 126 in the rectangular opening 124 contacts both a major flat portion of the movable rail 114 and a bottom portion of the stationary rail 112, while, the bearing balls 122 in the circular cuts 120 contact both the inwardmost flat ends 118a (see FIG. 7) of the curled side portions of the base structure 118 and the inwardly bent flat portions 114a (see FIG. 9) of the movable rail 114. Due to rotation of the rollers 126 and the bearing balls 122, the movement of the movable rail 114 and thus the movement of the seat proper relative to the stationary rails 112 are smoothly made. A plurality of projections (not shown) are formed on the bottom portion of the stationary rail 112 at evenly spaced intervals to suppress excessive displacement of each slide assisting unit 116 relative to the stationary rail 112.

Although not shown in the drawings, a known position locker is incorporated with one of the slide units to lock the associated movable rail 114 and thus the seat proper at a desired position relative to the stationary rail 112.

However, the above-mentioned seat slide device 102 has the following drawback due to its inherent construction. This drawback will be described with reference to FIG. 10.

When, by accident, the associated vehicle is struck from behind, the seat occupant H is violently pressed at his or her back against the seat back 108 thereby producing a moment M which tends to turn the seat assembly 100 in a clockwise direction in FIG. 10. Thus, a forward portion of the seat assembly designated by reference P is subjected to an upwardly urging force F. As is understood from FIG. 11, the force F causes generation of a moment of $(F \times L_1)$ which is created by multiplying the force F by the length $L_1$ (which is the distance from the forward portion P to the forefront ball bearing 122), so that the forward portion P of the movable rail 114 of each slide unit tends to be bent upward. As is seen from FIG. 12, the moment $(F \times L_1)$ sometimes breaks the proper engagement between the movable and stationary rails 114 and 112, resulting in desengagement of the movable rail 114 from the stationary rail 112. One method of solving this drawback is to use rails having greater thickness. However, this method induces higher cost production of the seat slide device.

SUMMARY OF THE INVENTION

It is therefore an object of the present invention to provide an improved seat slide device which is free of the above-mentioned drawbacks.

According to the present invention, there is provided a seat slide device for sliding a seat relative to the floor, a movable rail secured to the seat, the movable rail being interlocked with the stationary rail in a manner to permit relative movement between the movable rail and the stationary rail in first and second opposite directions, a plurality of slide assisting units operatively disposed between the stationary rail and the movable rail, the slide assisting units smoothing relative displacement between the movable and stationary rails, and a projected structure operatively connected with a terminal one of the slide assisting units, the projected structure extending in the first direction beyond the terminal slide assisting unit and located with respect to the movable and stationary rails so that when the movable rail is subjected to a force which acts in a direction essentially normal to the first and second directions, the projected structure interconnects the movable and stationary rails in a manner to reduce the length of the movable rail over which the force can act to produce a moment of force which tends to bend the movable rail away from the stationary rail.

BRIEF DESCRIPTION OF THE DRAWINGS

Other objects and advantages of the present invention will become apparent from the following description when taken in conjunction with the accompanying drawings, in which:

FIG. 8 is a side and partial view of the conventional seat slide device;

FIG. 9 is a sectional view taken along the line IX—IX of FIG. 8;

FIG. 10 is a side view of a seat assembly which is equipped with the conventional seat slide device, showing a person sitting on the seat;

FIG. 11 is a view similar to FIG. 8, but showing a condition wherein a forward portion of the seat slide device is deformed; and FIG. 12 is a sectional view taken along the line XII—XII of FIG. 11.

DETAILED DESCRIPTION OF THE INVENTION

In the following, the seat slide device of the present invention will be described in detail with reference to FIGS. 1 to 6 of the drawings.

Figure 1:
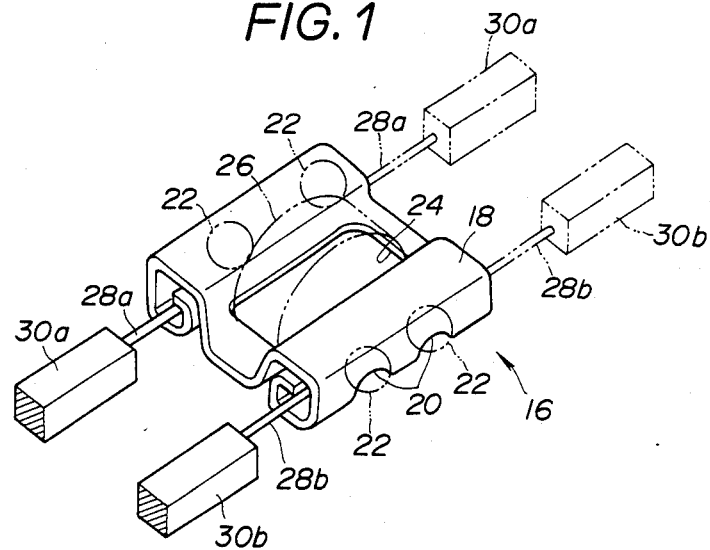
FIG. 1 is a perspective view of a slide assisting unit employed in a first embodiment of a seat slide device of the present invention.
Figure 2:
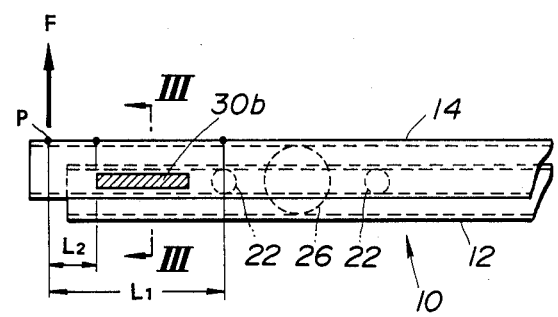
FIG. 2 is a side and partial view of the seat slide device of the first embodiment.
Figure 3:
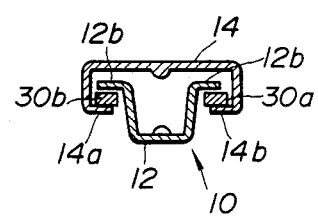
FIG. 3 is a sectional view taken along the line III—III of FIG. 2.

Referring to FIGS. 1 to 3, particularly FIGS. 2 and 3, there is shown but partially a seat slide device 10 of a first embodiment of the present invention. Similar to the above-mentioned conventional one, the device 10 comprises two slide units which are arranged between the seat cushion and the vehicle floor. These two slide units are essentially the same in construction and configuration.

Each slide unit comprises a stationary rail 12 which is secured to the vehicle floor to extend in fore-and-aft direction, and a movable rail 14 which is secured to the seat cushion and slidably disposed on the stationary rail 12. As is seen from FIG. 3, the stationary rail 12 has a channel-like configulation with outwardly projected upper flanges 12a and 12b, and the movable rail 14 has also a channel-like configulation with inwardly projected lower flanges 14a and 14b which are juxtaposed or slidably interlocked with the flanges 12a and 12b of the stationary rail 12.

Although not shown in the drawings, a known position locker is incorporated with one of the slide units to lock the associated movable rail 14 and thus the seat proper at a desired position relative to the stationary rail 12.

A plurality of slide assisting units having the same construction as the afore-mentioned conventional unit 16 are arranged between the stationary and movable rails 12 and 14 in order to smooth the movement of the movable rail 14 relative to the stationary rail 12.

However, in the invention, the forefront one of the units has such a construction as shown in FIG. 1. As is seen from this drawing, the forefront unit 16 has substantially the same construction as the conventional unit 116 except some additional parts.

That is, the forefront unit 16 comprises a generally rectangular base structure 18 which is formed with a pair of curled side portions each having at the lower portion thereof two circular cuts 20 for rotatably receiving therein bearing balls 22. The base structure 18 is further formed at its middle portion with a rectangular opening 24 for rotatably receiving therein a roller 26.

As shown in FIG. 1, in the invention, two rods 28a and 28b are respectively secured to the curled side portions of the base structure 18 and extend forward therefrom. It is to be noted that the rods 28a and 28b are connected to the curled side portions in such a manner as not to interfere with the bearing balls 22. Two rectangular parallelepiped blocks 30a and 30b constructed of, for example, plastics are secured to the leading ends of the rods 28a and 28b respectively.

Upon assembly, the base structure 18, the ball bearings 22 and the roller 26 are arranged in the afore-mentioned manner as is understood from FIG. 9, and as is seen from FIGS. 2 and 3, each rectangular parallelepiped block 30b or 30a is slidably received in a clearance defined between the juxtaposed flanges 12a and 14a (or 12b and 14b) of the stationary and movable rails 12 and 14. Of course, other slide assisting units 116 having the conventional construction are arranged behind the forefront unit 16. As is seen from FIG. 3, a plurality of projections (no numeals) are formed on the inward sides of both the stationary and movable rails 12 and 14 to suppress excessive displacement of each slide assisting unit 16 or 116 relative to the rails.

When, by accident, the associated vehicle is struck from behind, the forward portion P of the movable rail 14 is instantaneously subjected to an upwardly urging force F due to the afore-mentioned reason. The force F causes a generation of a moment of $(F \times L_2)$ which is created by multiplying the force F by the length $L_2$ (which is the distance from the forward portion P to the front end of the rectangular block 30a or 30b). It is however to be noted that due to the nature of the arrangement of the block 30a or 30b, the length $L_2$ is smaller than the length $L_1$, and thus, the value of $(F \times L_2)$ is smaller than the value of $(F \times L_1)$ which is possessed by the afore-mentioned conventional seat slide device 102. That is, in the invention, the blocks 30a and 30b and the rods 28a and 28b act as a reinforcing means. Accordingly, in the invention, the undesirable deformation of the rails 12 and 14 is prevented or at least minimized.

If desired, as is shown by a phantom line in FIG. 1, the blocks 30a and 30b and the rods 28a and 28b may be connected to the rear portions of the base structure 18. Substantially the same function is achieved also in this modification.

Figure 4:
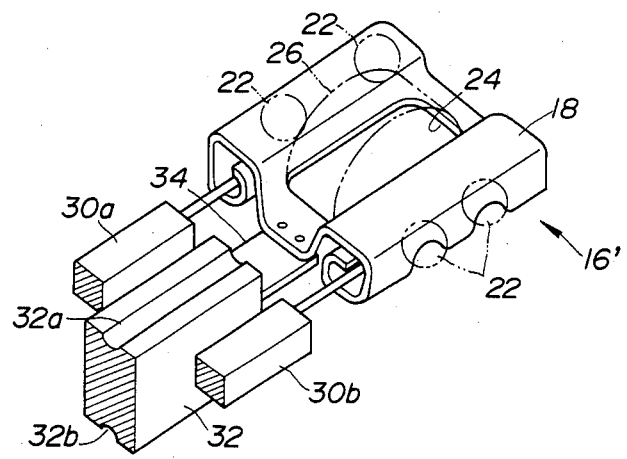
FIG. 4 is a perspective view of another slide assisting unit employed in a second embodiment of the invention.
Figure 5:
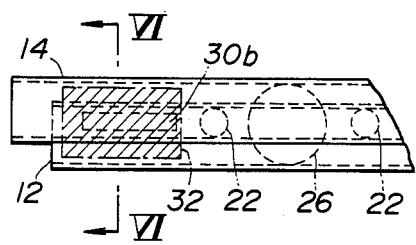
FIG. 5 is a side and partial view of the seat slide device of the second embodiment.
Figure 6:
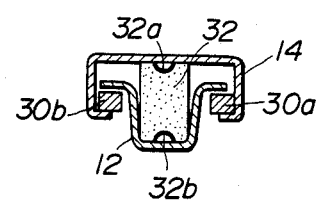
FIG. 6 is a sectional view taken along the line VI—VI of FIG. 5.
Figure 7:
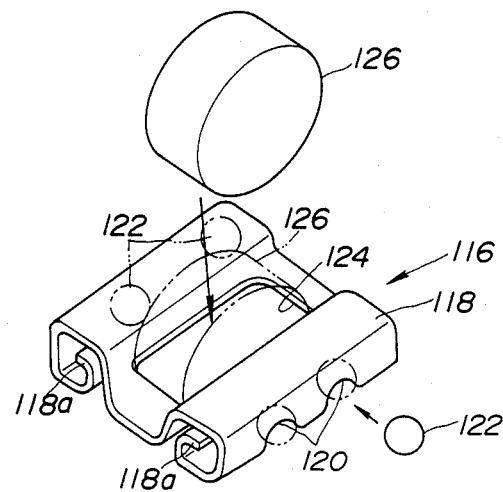
FIG. 7 is a perspective view of a slide assisting unit employed in a conventional seat slide device.

Referring to FIGS. 4 to 6, there is shown a second embodiment of the present invention, which is much more improved as compared with the first embodiment.

As is seen from FIG. 4, a forefront slide assisting unit 16' employed in this second emboidment has substantially the same construction as the unit 16 of the first embodiment except one additional part. That is, in this second embodiment, an enlarged rectangular parallelepiped block 32 is additionally connected through a bracket 34 to the front middle portion of the base structure 18. The block 32 is formed at its upper and lower sides with grooves 32a and 32b into which, upon assembly, the stopper projections of the movable and stationary rails 14 and 12 are slidably received. As is seen from FIG. 6, the block 32 is sized and constructed so as to slidably fit the channel of the stationary rail 12.

Upon assembly, the base structure 18, the ball bearings 22, the roller 26 and the rectangular parallelepiped blocks 30b and 30a are arranged in the afore-mentioned manner, and as is seen from FIG. 6, the additional enlarged block 32 is slidably received in the channel of the stationary rail 12.

Due to the provision of the additional block 32, the undesirable deformation of the rails 12 and 14 is much more assuredly prevented. Because of the slidable fitting of the additional block 32 relative to the side walls of the channel-shaped stationary rail 12, undesirable inward bending of the side walls (as shown in FIG. 12) is prevented.

As is seen from the foregoing description, in accordance with the present invention, the undesirable deformation of the movable and stationary rails, particularly at the front portions thereof, is prevented even when the associated motor vehicle is struck from behind.

What is claimed is:

1. A seat slide device for sliding a seat relative to a floor, comprising:
    a stationary rail secured to said floor;
    a movable rail secured to said seat, said movable rail being interlocked with said stationary rail in a manner to permit relative movement between said movable rail and said stationary rail in first and second opposite directions;
    a plurality of slide assisting units operatively disposed between said stationary rail and said movable rail, said slide assisting units smoothing relative displacement between said movable and stationary rails; and
    a projected structure operatively connected with a terminal one of said slide assisting units, said projected structure extending in said first direction beyond said terminal slide assisting unit and sandwiched between said movable and stationary rails so that when said movable rail is subjected to a force which acts in a direction essentially normal to said first and second directions, said projected structure interconnects said movable and stationary rails in a manner to reduce the length of the movable rail over which said force can act to produce a moment of force which tends to bend said movable rail away from said stationary rail.

2. A seat slide device as claimed in claim 1, in which said projected structure comprises a block which is connected through a rod to the terminal slide assisting unit, said block being slidably received in a space defined between interlocked flanges of said movable and stationary rails.

3. A seat slide device as claimed in claim 2, in which said projected structure further comprises an additional block which is connected through a bracket to the terminal slide assisting unit, said additional block being slidably received in a space defined between a major portion of said stationary rail and a major portion of said movable rail.

4. A seat slide device for sliding a seat relative to a floor, comprising:
    a stationary rail secured to said floor, said stationary rail having a channel-like configuration with outwardly projected upper flanges;
    a movable rail secured to said seat and slidably disposed on said stationary rail in a manner to permit movement of said movable rail in first and second opposite directions relative to said stationary rail, said movable rail having a channel-like configuration with inwardly projected lower flanges which are juxtaposed with the upper flanges of said stationary rail;
    a plurality of slide assisting units operatively disposed between said stationary rail and said movable rail to smooth movement of said movable rail relative to said stationary rail;
    a projected structure operatively connected with a terminal one of said slide assisting units, said projected structure extending in said first direction beyond said terminal slide assisting unit and sandwiched between said movable and stationary rails so that when said movable rail is subjected to a force which acts in a direction essentially normal to said first and second directions, said projected structure interconnects said movable and stationary rails in a manner to reduce the length of movable rail over which said force can act to produce a moment of force which tends to bend said movable rail away from said stationary rail.

5. A seat slide device as claimed in claim 4, in which said projected structure comprises:
    two rods extending from said terminal slide assisting unit; and
    two rectangular blocks secured to the leading ends of said rods, each of said rectangular blocks being slidably received in a clearance defined between the juxtaposed flanges of said stationary and movable rails.

6. A seat slide device as claimed in claim 5, in which said projected structure further comprises an additional rectangular block which is connected through a bracket to said terminal slide assisting unit, said additional rectangular block being slidably received in a space defined between a major portion of said stationary rail and a major portion of said movable rail.

7. A seat slide device as claimed in claim 6, in which each of said slide assisting units comprises:
    a base structure having a pair of curled side portions each having circular cuts;
    ball bearings respectively and rotatably received in said circular cuts; and
    a roller rotatably received in a rectangular opening formed in a middle portion of said base structure,
    wherein, upon assembly, said ball bearings contact both the inwardmost flat ends of the curled side portions and the inwardly bent flat portions of the flanges of the movable rail and said roller contacts both the major portion of the movable rail and a bottom portion of said stationary rail.

8. A seat slide device as claimed in claim 7, in which said rods of said rectangular blocks of said projected structure extend from the curled side portions of said base structure respectively, and said bracket of said additional rectangular block extends from a middle portion of said base structure.

9. A seat slide device as claimed in claim 8, in which said additional rectangular block is sized and constructed so as to slidably fit a channel defined by said stationary rail.

* * * * *